United States Patent Office 3,432,257
Patented Mar. 11, 1969

3,432,257
USE OF SULFONIUM SALTS IN LIQUID/LIQUID METAL EXTRACTION
Ernst L. Th. M. Spitzer, and Johannes Radder, Amsterdam, Netherlands, assignors to Shell Oil Company, New York, N.Y., a corporation of Delaware
No Drawing. Filed Dec. 27, 1966, Ser. No. 604,619
Claims priority, application Netherlands, Jan. 18, 1966, 6600609
U.S. Cl. 23—87          8 Claims
Int. Cl. C01b 9/00

ABSTRACT OF THE DISCLOSURE

Iron, cobalt and copper are extracted from aqueous acidic halide-ion containing solutions of their salts (preferably HCl solutions) with an oleophilic sulfonium salt (e.g., di-n-octyl methyl or di-n-dodecyl methyl sulfonium chloride) dissolved in a liquid water-immiscible organic solvent for the sulfonium salt, particularly chlorohydrocarbons and chlorinated ethers, followed by recovering the metal values from the separated extract, as by hydrolysis and water extraction.

---

The present invention relates to the separation of metals from solutions of their salts in water by liquid/liquid extraction with organic extracting agents, and in particular to the selective extraction of metals from aqueous solutions of mixtures of salts derived from different metals, using sulfonium salts as selective extracting agents.

THE PRIOR ART

The term "metals," used in the present application, is synonymous with the technical term "metal values," and includes as well compounds of metals, notably salts thereof, or ions derived therefrom which may or may not contain the relevant metal in a complex.

The extraction of metals from aqueous solutions of their salts is applied in numerous technical processes which, for example, aim to isolate, or at least concentrate, the desired metals, starting from more or less dilute solutions. Other processes, however, aim at removing undesired metals from aqueous liquids. An especially important aspect is the selective extraction of a particular metal, by which separation of metals differing from each other can be effected. Especially in the hydrometallurgical industry, such methods have been adopted with increasing frequency. In such cases the starting materials usually are solutions resulting from the leaching of ores (e.g., with water, acids, bases or salt solutions) after the raw ores have been brought into a suitable form by crushing, grinding, screening and/or flotation. The metals thus separated can then be subjected to further treatment, such as precipitation, electrolysis and/or pyrometallurgical processes.

Long et al. in U.S. 3,128,156, issued Apr. 7, 1964, disclose a process for the separation of cobalt values from nickel values, which makes use of ammonium salts which have at least one hydrogen atom linked to the central nitrogen atom.

Various other means have been suggested for the separation of metal values, for example, the use of anion exchange resins containing a structurally bound tertiary sulfonium cation for the absorption of transition metal ions, particularly Zn(II) and Fe(III) from concentrated chloride ion solutions (e.g., HCl and LiCl) prepared from trianisyl sulfonium chloride by polymerization with formaldehyde. See, e.g., Lindenbaum et al., "J. Phys. Chem." 62 (1958), 995–999. Further, U.S. 2,768,990 to De Jong, issued Oct. 30, 1956, discloses, inter alia, resins containing trialkyl sulfonium groups for exchanging anions. Anion exchange in aqueous solution with anions of an onium compound, e.g., of the sulfonium type, chemically bound with a solid hydrocarbon carrier, and the regeneration of the onium compound by treatment with a different anion is known from U.S. 2,102,103, to Urbain et al., issued Dec. 14, 1937.

THE INVENTION

A process has now been found for separating metals from solutions of their salts in water by liquid/liquid extraction with organic extracting agents, an acidic halide ion-containing aqueous solution of one or more metal salts is intimately contacted with a liquid which contains one or more oleophilic sulfonium salts and which mixes only partly, if at all, with the aqueous phase, after which the extracted metal(s) can be recovered from the extract phase.

THE EXTRACTING AGENT

The extracting agent generally used is a solution of one or more sulfonium salts in a water-immiscible (at least substantially) organic solvent. Here, it has proved advantageous to use sulfonium salts which are considerably more soluble in the organic phase than in the aqueous phase. Although the total number of carbon atoms in the molecule may vary between rather wide limits, sulfonium salts with an "effective chain length" of at least 9 atoms are preferred, particularly those containing between about 15 and 25 atoms. By "effective chain length" is meant the number of atoms that are part of the longest chain present in the molecule which may contain not only carbon atoms but, in addition, also a sulfur atom. Thus, the effective chain length of, for example, a didodecyl methyl sulfonium salt amounts to 25 atoms, since the longest chain consists of (2×12=) 24 carbon atoms and one sulfur atom. Chains which are too long, for example, those with an effective chain length of more than 25 atoms, generally cause emulsion formation which impedes the extraction process. Sulfonium salts with a single sulfonium group in the molecule have proved especially suitable. However, if desired, the molecule may also contain more than one sulfonium group, for example, two or three. Tertiary sulfonium salts, i.e., those in which no hydrogen atoms are attached to the sulfur atom, are preferred. Generally, they are trihydrocarbyl sulfonium halides or sulfates, preferably trialkyl sulfonium salts with at least one alkyl of at least 4 carbons and with a total of at least 9 carbons.

As the acid ion of the sulfonium salt, generally an ion derived from a hydrohalic acid is preferred, in particular the chloride ion. Halide ions which correspond to those present in the aqueous phase are generally recommendable. However, numerous other anions, such as the methyl sulfate ion, can also be employed.

Examples of suitable sulfonium salts are: diisoamyl methyl and n-hexadecyl n-dodecyl methyl sulfonium chloride, $C_{10-18}$-alkyl dimethyl sulfonium methyl sulfate, and in particular di-n-octyl methyl and di-n-dodecyl methyl sulfonium chloride $[(C_8H_{17})_2S—CH_3]^+Cl^-$ and

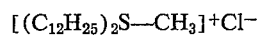

respectively.

The sulfonium salts referred to can be obtained easily from inexpensive base materials, for example, by methylation of thioethers obtained from olefins and $H_2S$, which makes the new process economically attractive.

THE SOLVENTS

For extraction according to the invention, the sulfonium salt is used in dilute form, preferably in a liquid medium in which it is completely soluble, and which is only slightly miscible, if at all, in the aqueous phase.

Here, halogenated aliphatic hydrocarbons and halogenated ethers are used to advantage, especially aliphatic solvents such as chloroform, 1,2-dichloroethane, 1,2-dichloropropane and di(2-chloroethyl)ether. The solubility of the sulfonium salt can be increased, if required, by means of solubilizing agents. In general, the solvent is an organic liquid, and may be polar or aqueous non-polar, so long as it is non-reactive with and relatively immiscible with the aqueous phase.

The aqueous phase in which one or more of the metal salts to be separated are dissolved, should be acidic, and should, moreover, contain halogen ions. It has been found that the extraction of the metals is promoted as the acidity of the solution increases. This, at least, holds for conditions where other factors, such as the nature and concentration of the sulfonium salt, of the halogen ions and the solvent, are the same. The acid concentration of the solution to be extracted may amount to, for example, 12 gram-equivalents or more. The halogen ions which are present also, preferably chlorine ions, may be derived, among others, from a salt such as NaCl. It is preferred, however, to use a hydrohalic acid, in particular hydrochloric acid.

THE METAL VALUES

The optimum acidity required for efficient separation of the metals is dependent on, among other factors, the nature of the relevant metal. For example, from a 6 N HCl solution, using a $C_{10-18}$-alkyl dimethyl sulfonium chloride, the iron present was virtually completely separated under certain conditions, whereas the extraction of copper under comparable conditions yielded no more than approximately half of the total quantity. The behavior of cobalt proved to be similar to that of copper. For optimum extraction of the latter metal an approximately 12 N HCl solution was required. For another sulfonium salt, di-n-octyl methyl sulfonium chloride, this optimum was already reached with 8 N HCl, while under these conditions, in addition, a more complete extraction could be effected. Although the extraction usually becomes much more efficient as the acidity increases it is often more advantageous to work at a lower acidity and to carry out the extraction in stages. It is especially recommendable to carry out the process continuously and/or to apply a countercurrent process. For the separation of iron it is generally advantageous to start from a 1 N to 4 N HCl solution, whereas for cobalt, 4 N to 8 N solutions are usually suitable.

The process according to the invention is eminently suited for the selective extraction of certain metals from aqueous solutions, whereby a separation of the pertaining metals is effected. Some examples are in particular: the separation of iron and/or copper from cobalt, or from cobalt and nickel, and particularly the separation of cobalt from nickel. It has, for example, proved possible to separate Fe, Cu, Co and Ni from one another preferentially in the indicated sequence. Here, the separation of one or more of the metals mentioned first from nickel is particularly simple, since the latter metal is left virtually unextracted by sulfonium salts. Nickel is, therefore, generally separated from the remaining aqueous phase. If desired, the extractions may be carried out at different acidities, the process being carried out first at a lower, and subsequently at a higher acidity. Efficient extractions are often also accomplished with a sulfonium salt suitable for that purpose, at one particular acidity. For the rest, the normality of the acid that is most conducive to an optimum separation is dependent on, among other factors, the nature of all metals contained in the mixture, and hence this normality ordinarily differs from the optimum normality for the extraction of a certain metal when no other metals are present. In order to effect complete separations it is usually necessary to carry out the extractions in several stages consecutively, a continuous process and/or the countercurrent principle being preferred.

It seems probable that the metals which are extracted react with the sulfonium salt in the form of an anionic complex, for example, cobalt as $(CoCl_4)^=$. The task of the essential halide ions is to form such complexes, which react with the sulfonium cation to form a metal-containing sulfonium salt. From this sulfonium salt, the metal can subsequently be recovered as metal halide, for example, as $CoCl_2$, by means of hydrolysis. Transition metals have generally proved very suitable for extraction, especially metals with atomic numbers from 24 up to and including 30.

The base materials used are particularly aqueous solutions obtained by leaching of ores. Here, it may be advantageous first to remove certain metals by means of other methods, for example Fe and/or Cu by precipitation or by extraction with another extracting agent, and to restrict the application of the new process to the remaining metals, for instance, to the separation of cobalt from nickel.

The aqueous solution which contains one or more metal salts is usually, after the addition of a hydrohalic acid, brought into contact with the sulfonium-salt solution, it being recommendable to promote contact between the phases as much as possible by stirring vigorously. It is usual for stirring to be continued until equilibrium between the phases has been reached, which is generally the case after only a few minutes. Emulsions which may have been formed can be broken if required by adding demulsifying agents such as alcohols. The extraction generally proceeds readily at ambient (room) temperature. However, higher or lower temperatures are not excluded.

If desired, the extracted metals can be regenerated from the organic phase. For this purpose, treatment of the organic layer with water or with dilute HCl has proved very advantageous; hydrolysis takes place and the metal moves to the water phase. The metal salts can then finally be isolated from the aqueous phase, for instance, by evaporation of the water, while the organic phase with the sulfonium salt released during the hydrolysis can be used again for a new extraction. In this way, the metal extraction can be effected economically as a continuous process.

The following examples are given for illustrative purposes only, and are not intended to be limitations on the invention.

THE EXAMPLES

Example I.—Preparation of sulfonium salts

The sulfonium salts used as starting material had been prepared by methylation of the corresponding dialkyl sulfides with dimethyl sulfate. Here, the $C_{10-18}$-alkyl methyl sulfides had been obtained by conversion of a mixture of $C_{10-18}$-olefins (obtained from cracking processes) with methyl mercaptan. For the extractions of metal salts described below, the trialkylsulfonium methyl sulfates thus prepared were first converted into solutions of the corresponding chlorides, as follows:

50 ml. of 3 N HCl was added to 100 ml. of an 0.4 M solution of the sulfonium methyl sulfate in the relevant solvent, e.g. chloroform, 1,2-dichloroethane or di(2-chloroethyl)ether, after which the mixture was stirred vigorously (approx. 2000 r.p.m.) for one minute at room temperature. Subsequently, the solution of the sulfonium chloride so obtained was separated from the aqueous layer.

Example II.—Selective extractions of metals from aqueous solutions of their salts (a) WITH DI-N-OCTYL METHYL SULFONIUM CHLORIDE The solution of the sulfonium chloride obtained (100 ml., 0.4 M) was added to 50 ml. of a hydrochloric acid solution of the relevant metal chlorides in water, followed by one minute's vigorous stirring (approx. 2000 r.p.m.). Subsequently, the organic layer was separated and stirred vigorously with 50 ml. of water. Separation of the resulting phases produced an aqueous layer with the extracted metals, and an organic layer which contained the regenerated sulfonium chloride and which could be re-used.

(b) WITH DI-N-DODECYL METHYL, N-HEXADECYL N-DODECYL OR $C_{10-18}$-ALKYL DIMETHYL SULFONIUM CHLORIDE

The extractions were carried out as described under (a), but here 45 ml. of 0.6 N HCl and 5 ml. of ethanol were used for liberating the metals from the organic layer.

Example III.—Selective separation of cobalt from cobalt nickel solutions

Table I below, shows the influence of the organic solvent, the nature of the sulfonium salt and its concentration, on the extraction of cobalt from a 6 N HCl solution which contained 15 g. of cobalt and 5 g. of nickel in the form of chlorides.

TABLE I

| Extracting agents | | Extracted metal in percent wt. of amount originally present | |
|---|---|---|---|
| Sulfonium Chloride | Concentration in $CHCl_3$ | Cobalt | Nickel |
| $C_{10-18}$-alkyl dimethyl | 0.4 M | 46.9 | 6.4 |
| Di-n-octyl methyl | 0.4 M | 85.9 | 0.5 |
| Do | 0.1 M | 30.0 | |
| Do | 0.4 M [1] | 91.4 | 0.8 |
| Do | 0.4 M [2] | 98.8 | 0.5 |
| Do | 0.4 M | 80.4 | 0.3 |
| Do | 0.113 M | 35.2 | |
| n-Hexadecyl n-dodecyl methyl | 0.4 M | 88.2 | 1.0 |
| Do | 0.2 M | 63.6 | |
| Do | 0.1 M | 33.5 | |

[1] In di(2-chloroethyl)ether instead of $CHCl_3$.
[2] In 1,2-dichloroethane instead of $CHCl_3$.

Table II illustrates the effect of the acidity and the influence of the structure of the sulfonium chloride used, on the extraction of cobalt (and nickel) from aqueous HCl solutions of different normality which contained 15 g. of Co and 5 g. of Ni in the form of their chlorides.

TABLE II

| Normality of aqueous HCl solution | Extracted metal in percent wt. of amount originally present | | | |
|---|---|---|---|---|
| | With $C_{10-18}$-alkyl dimethyl sulfonium chloride | | With di-n-octyl methyl sulfonium chloride | |
| | Cobalt | Nickel | Cobalt | Nickel |
| 1 N | 6.5 | | 1.82 | |
| 2 N | 9.0 | 8.0 | 6.8 | <0.16 |
| 4 N | 22.5 | 9.2 | 39.0 | 0.24 |
| 5.2 N | 34.2 | 6.8 | | |
| 6 N | 46.9 | 6.4 | 85.9 | 0.5 |
| 8 N | 70.6 | 6.0 | 95.5 | |
| 12, 17 N | 85.1 | | | |

Under similar conditions, with $C_{10-18}$-alkyl dimethyl sulfonium chloride, 17.9% wt. of cobalt was extracted from an analogous solution to which sodium chloride and sulfuric acid (6 M $H_2SO_4$ and 2 M NaCl) had been added instead of HCl.

Example IV.—Selective separation of Iron from iron/copper solutions

Table III gives the extraction of iron and copper from aqueous solutions of different acidity, which contained 18.6 g. of Fe and 25.4 g. of Cu in the form of their chlorides, $C_{10-18}$-alkyl dimethyl and di-n-octyl methyl sulfonium chloride being applied as in Example III.

TABLE III

| Normality of aqueous HCl solution | Extracted metal in percent wt. of amount originally present | | | |
|---|---|---|---|---|
| | With $C_{10-18}$-alkyl dimethyl sulfonium chloride | | With di-n-octyl methyl sulfonium chloride | |
| | Iron | Copper | Iron | Copper |
| 0.5 N | 26.7 | 12.6 | 37.8 | 6.0 |
| 1 N | 55.2 | 18.4 | 63.0 | 12.8 |
| 2 N | 87.8 | 30.8 | 88.2 | 23.0 |
| 3 N | 92.6 | 39.9 | | |
| 6 N | 99.2 | 52.7 | | |

Under similar conditions, with $C_{10-18}$-alkyl dimethyl sulfonium chloride, 57.6% wt. of iron was extracted from an analogous solution to which sodium chloride and sulfuric acid (6 M $H_2SO_4$ and 2 M NaCl) had been added instead of HCl.

We claim as our invention:

1. A process of extracting iron, cobalt or copper from aqueous acidic solutions of their halides by intimately contacting the aqueous solution with a liquid which is at least partially immiscible in the aqueous phase and which contains at least one tertiary sulfonium salt, to produce a sulfonium extract phase enriched in the metal, and recovering the metal from the separated sulfonium extract phase.

2. A process in accordance with claim 1, wherein the sulfonium salts are trihydrocarbyl sulfonium salts of an effective chain length of about 15 to 25 atoms.

3. A process in accordance with claim 1, wherein the sulfonium salts are employed as chlorides.

4. A process in accordance with claim 1, wherein the liquid in which the sulfonium salt is employed is a halogenated aliphatic hydrocarbon.

5. A process in accordance with claim 1, wherein the liquid in which the sulfonium salt is employed is a halogenated aliphatic ether.

6. A process in accordance with claim 1, wherein the extracted metal is recovered from the sulfonium extract by hydrolysis and water extraction.

7. A process in accordance with claim 1, wherein cobalt is separated from a 4 N to 8 N HCl solution.

8. A process in accordance with claim 1, wherein iron is separated from a 1 N to 4 N HCl solution.

References Cited

UNITED STATES PATENTS

| 2,909,542 | 10/1959 | Soloway | 23—87 XR |
| 3,082,062 | 3/1963 | Preuss | 23—87 XR |
| 3,128,156 | 4/1964 | Long et al. | 23—312 |
| 3,131,998 | 5/1964 | Swanson | 23—87 |
| 3,216,786 | 11/1965 | Corte et al. | 23—97 XR |
| 3,251,646 | 5/1966 | Alon et al. | 23—97 XR |
| 3,336,133 | 8/1967 | Funatsu et al. | 23—87 XR |

EDWARD STERN, *Primary Examiner.*

U.S. Cl. X.R.

23—97, 312